R. RADDATZ.
BANDING MACHINE.
APPLICATION FILED JULY 3, 1918.

1,333,340.

Patented Mar. 9, 1920.
7 SHEETS—SHEET 1.

WITNESS:
J. F. Britt

INVENTOR
Richard Raddatz
BY
Geo. S. Young
ATTORNEY

R. RADDATZ.
BANDING MACHINE.
APPLICATION FILED JULY 3, 1918.
1,333,340.
Patented Mar. 9, 1920.
7 SHEETS—SHEET 4.
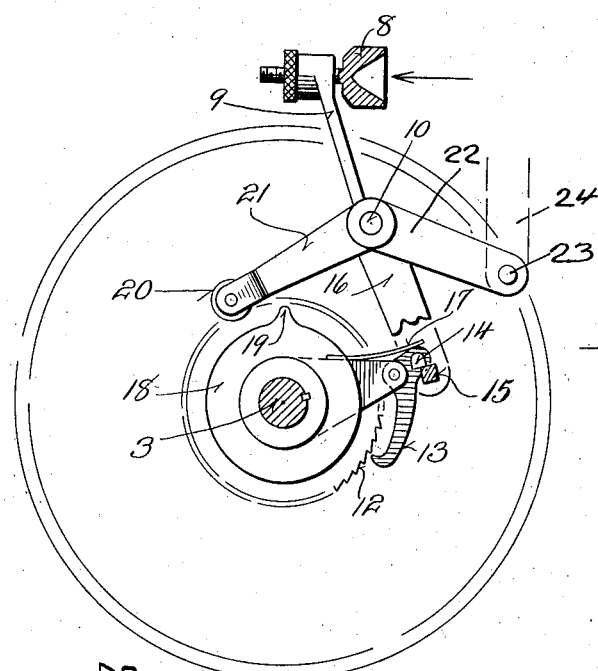
Fig. 4.
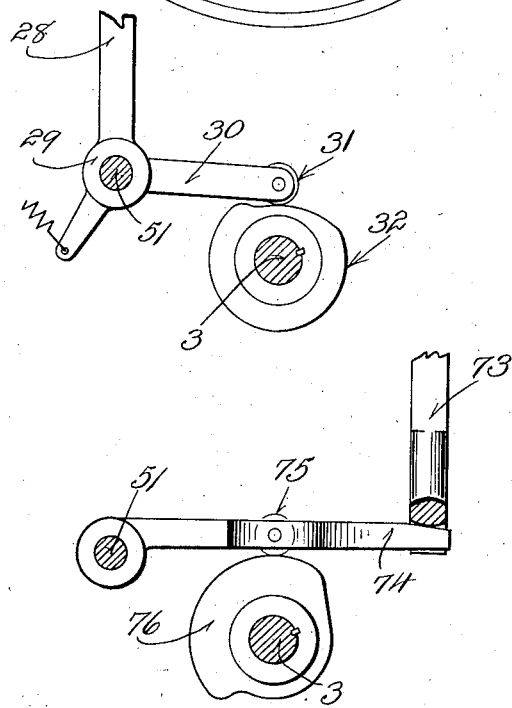
Fig. 5.
Fig. 6.
WITNESS:
J. F. Britt
INVENTOR
Richard Raddatz
BY Geo. W. Young
ATTORNEY

R. RADDATZ.
BANDING MACHINE.
APPLICATION FILED JULY 3, 1918.

1,333,340.

Patented Mar. 9, 1920.
7 SHEETS—SHEET 5.

WITNESS:
T. T. Britt

INVENTOR
Richard Raddatz
BY Geo. W. Young
ATTORNEY

R. RADDATZ.
BANDING MACHINE.
APPLICATION FILED JULY 3, 1918.
1,333,340.
Patented Mar. 9, 1920.
7 SHEETS—SHEET 6.
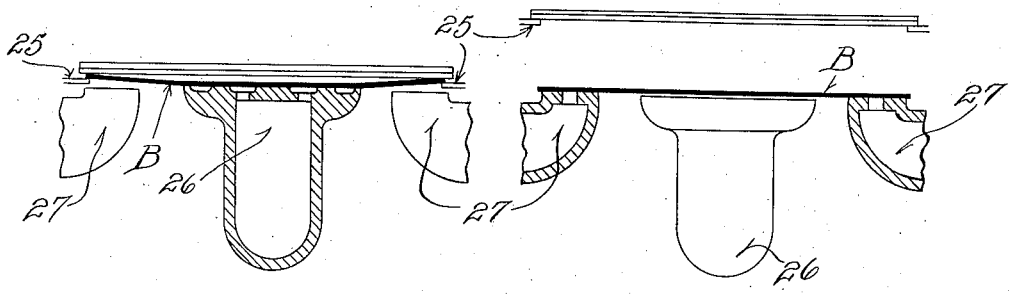
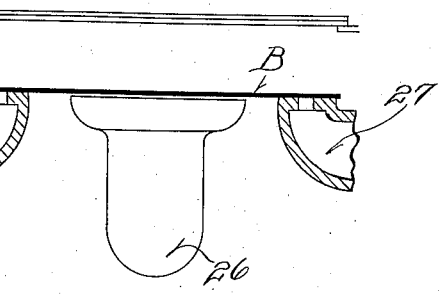
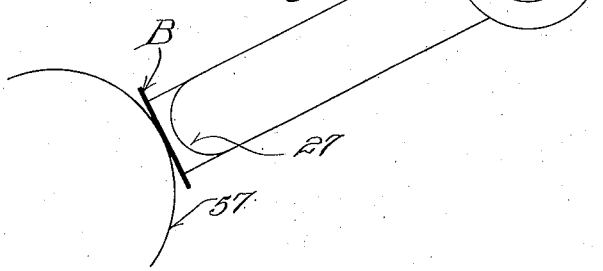
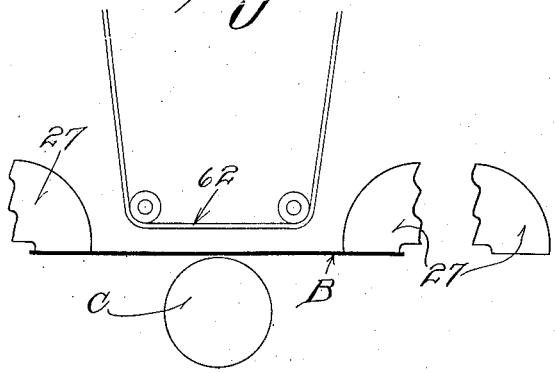
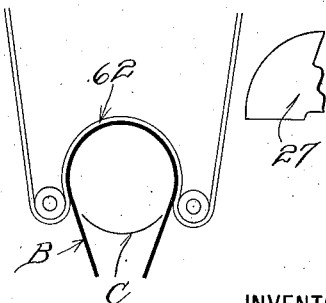
WITNESS:
J. P. Britt
INVENTOR
Richard Raddatz
BY
Geo. W. Young
ATTORNEY

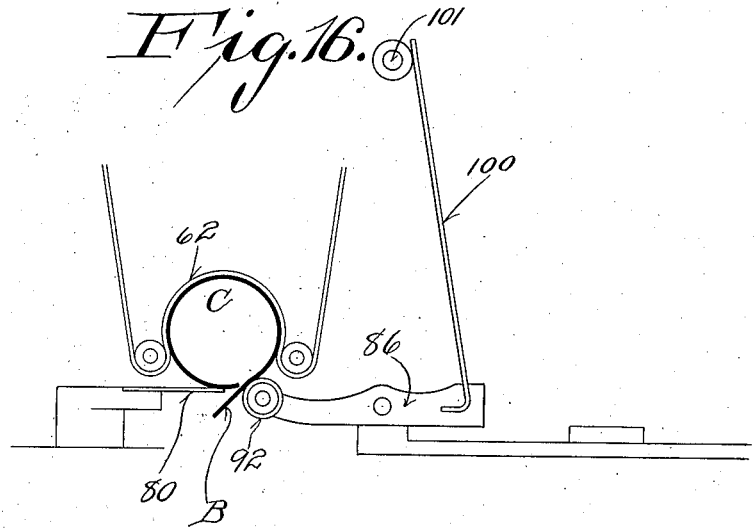
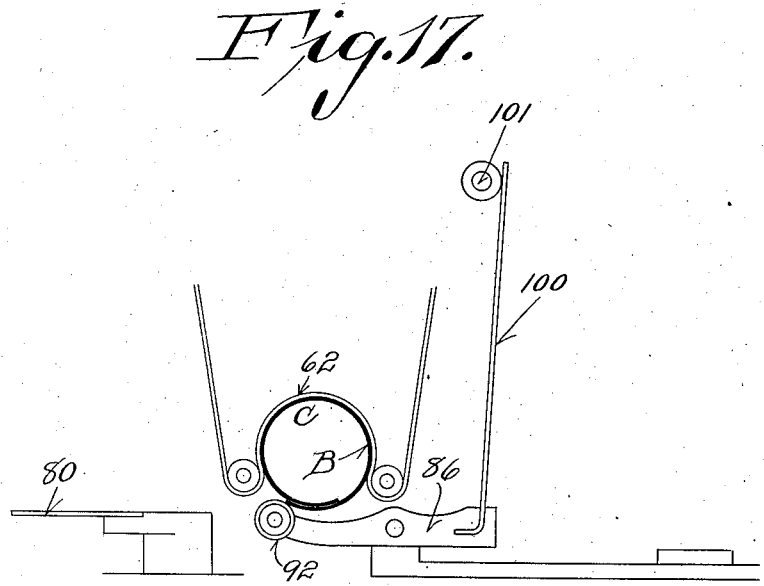

UNITED STATES PATENT OFFICE.

RICHARD RADDATZ, OF MILWAUKEE, WISCONSIN, ASSIGNOR, BY MESNE ASSIGNMENTS, TO LEDERER MACHINE COMPANY, A CORPORATION.

BANDING-MACHINE.

1,333,340.　　　　　Specification of Letters Patent.　　Patented Mar. 9, 1920.

Application filed July 3, 1918.　Serial No. 243,141.

*To all whom it may concern:*

Be it known that I, RICHARD RADDATZ, a citizen of the United States, and resident of Milwaukee, in the county of Milwaukee and State of Wisconsin, have invented certain new and useful Improvements in Banding-Machines; and I do hereby declare that the following is a full, clear, and exact description thereof.

My invention relates to new and useful improvements in banding machines, particularly that type which is used for applying bands to cigars.

It is the primary object of the invention to provide a machine of this character, all the operations of which are controlled by cam means, whereby each of said operations will be carried out at its proper time and the working of the machine rendered uniform.

It is also an object of the invention to provide a banding machine for cigars or the like in which the operation is automatically controlled by the application of a cigar or other article to be banded, the machine thus being inactive except when the article to be banded is positioned therein.

A further object of this improved machine is to provide means for wrapping a band snugly, but gently, about a cigar.

A still further object is to provide an improved band magazine in combination with a suction mechanism of novel design whereby bands may be successively and accurately removed from the supply in said magazine.

With these and many other objects and advantages in view, the invention resides in the novel features of construction, combination and formation of parts which will be hereinafter more particularly described and claimed.

In the accompanying drawings Figure 1 represents a front elevational view of a banding machine constructed in accordance with my present invention.

Fig. 4 is a transverse section, the direction of which is indicated generally by the line 4—4 of Fig. 1.

Figure 1:
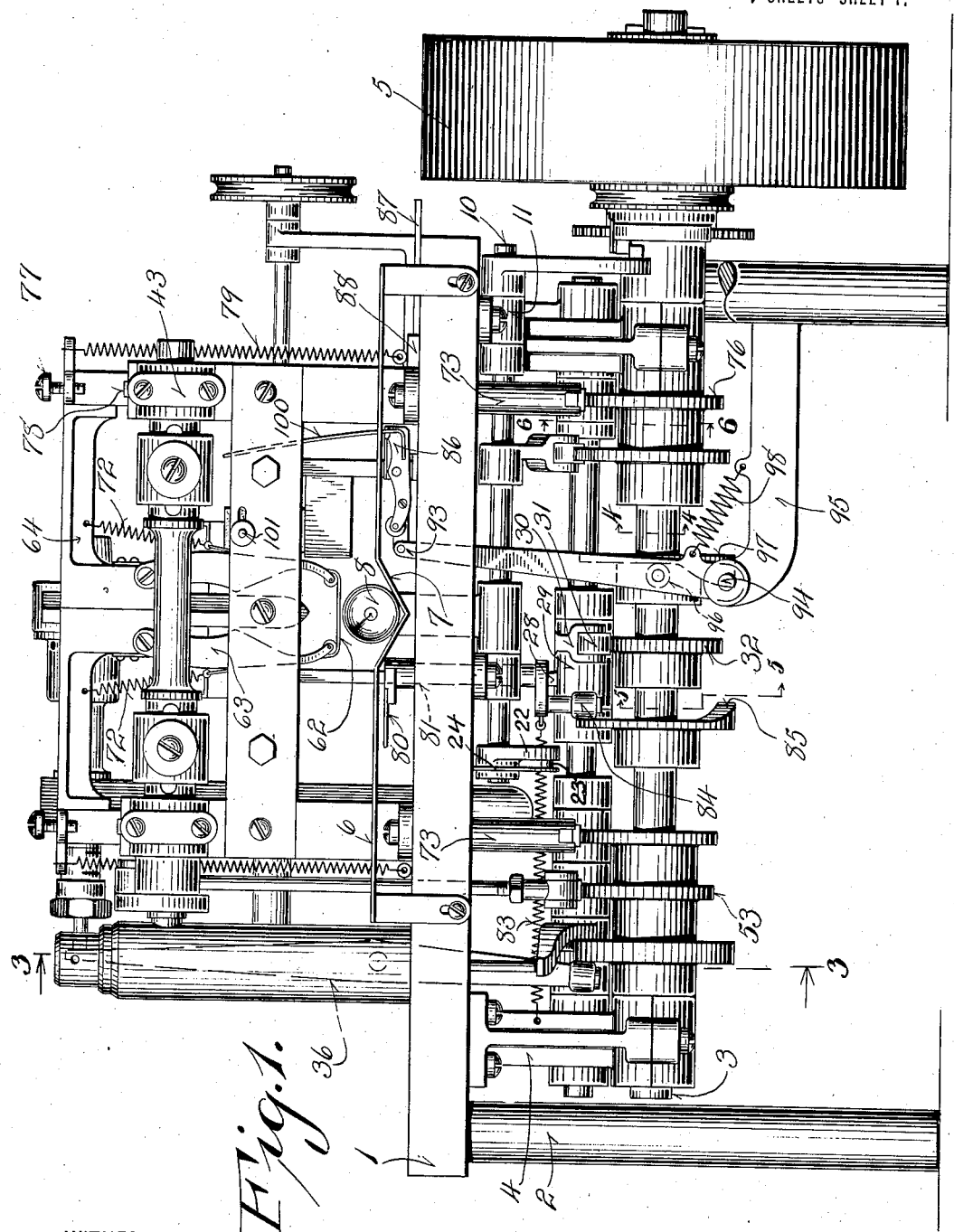

Figs. 5 and 6 are detail transverse sections taken on the planes of the lines 5—5 and 6—6 of Fig. 1.

Figure 7:
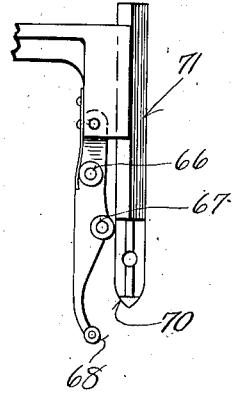
Figure 8:
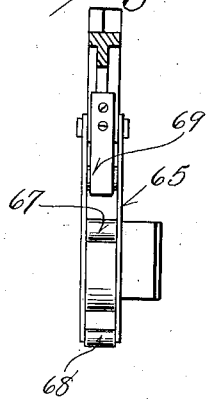

Figs. 7 and 8 are detailed views of one of the arms of the wrapping mechanism which initially disposes the band about the cigar and holds it until pasted.

Figure 9:
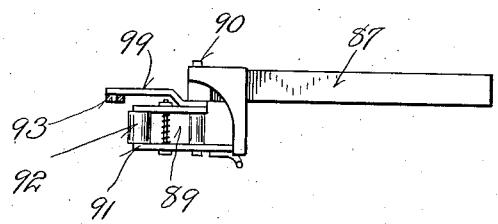

Fig. 9 is a detail plan view of the pasting or band affixing member.

Figure 10:
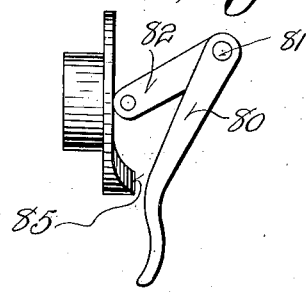

Fig. 10 is a detail plan view of the wiper and the cam means for actuating the same.

Figs. 11 and 12 are diagrammatic plan views, partly in section of the band magazine and the means for successively removing the bands therefrom.

Fig. 13 is an elevational view of the band carrying suction arms showing the manner in which they move the band into engagement with the periphery of the moistening roll.

Figs. 14, 15, 16 and 17 are semi-diagrammatic views illustrating the several successive steps in the wrapping of a band about a cigar and securing the same thereto after the paste on one end thereof has been moistened by the arrangement as shown in Fig. 13.

In the one embodiment of my invention as illustrated in the accompanying drawings, the same is shown for use in the application of bands or labels to cigars or other elongated round objects of relatively small diameter, but it is to be understood, however, that the same mechanism with only slight modification might well be used for banding other objects, whether the same be round or of other shapes.

Referring more particularly to the form of the invention depicted in the accompanying drawings it will be seen that the working parts thereof are mounted above and below a work table 1 and arranged in a very compact manner with respect thereto, said table being supported at a suitable height on legs 2. A cam shaft 3 is hung below the table 1 in hanger brackets 4 secured to the latter and on one end is loosely mounted a drive pulley 5 which is continuously rotated by a belt or the like from any suitable source of power.

An article holding tray 6 is located slightly above the top of the table 1 at the forward side thereof, it having a transversely extending, centrally arranged depression or groove 7 in which a cigar or the like is adapted to slide. Inward movement of the cigar is limited by a socketed stop 8 adjustably carried by the end of a crank 9 of a rock shaft actuating mechanism. The rock shaft 10 of said mechanism is journaled in bearings 11 secured to the under side of the table 1 and has the crank 9 secured thereto, the latter extending through the said table.

Secured to the cam shaft 3 adjacent the pulley 5 is a ratchet wheel 12, and carried by said pulley 5 for rotation therewith is a pivoted pawl 13, the end of which is adapted to engage the teeth of said ratchet wheel when in one position, whereby to cause said shaft 3 to rotate with the pulley when the latter is revolved in one direction. The pawl 13 is normally held out of engagement with the ratchet teeth of said wheel so that the pulley 5 runs free, this positioning of the pawl being procured by the engagement of stop lugs 14 and 15, the latter being carried by a pawl releasing arm 16 fixed to the rock shaft 10. From Fig. 4 it will be seen that when the shaft 10 is rocked by the engagement of a cigar or the like with the member 8, that the stop lug 15 is moved out of engagement with the lug 14, which is carried by the pawl 13, a spring 17 forcing the latter into engagement with said ratchet teeth.

The parts automatically return to the position shown in said Fig. 4 after one complete revolution of the cam shaft 3 by the movement of the lug 15 into the path of travel of the lug 14. A cam disk 18 fixed to the shaft 3 has a trip finger 19 that engages the roller 20 of a trip arm 21 when the lugs 14 and 15 are disengaged so as to procure a rocking of the shaft 10 in a direction reverse to that imparted thereto by the engagement of a cigar or other article with the stop 8.

Accidental movement of the rock shaft 10 is prevented by a tensioning device of improved design located at one end thereof. This device includes a tensioning arm 22 fixed to the rock shaft 10 and having a friction stud 23, and a leaf spring 24 carried by the table 1 and engaged with said stud. Said spring bears with considerable force against the friction stud and obviously retards the oscillation of the shaft 10 and holds it against any movements except that imparted to it by the shifting of the crank 9 or the trip arm 21.

When the operation of the machine has been started by the mechanism just described, a band magazine 25 is moved toward a stationary suction head 26 and a pair of movable suction arms 27, and when the outermost band in said magazine is against the face of the head 26 a vacuum is created therein and in the arms 27 successively, to cause said outermost band B to adhere thereto. Thus when the magazine is moved away from the suction members the outermost band will have been removed. Said band magazine 25 is mounted on the upper end of the substantially vertical arm 28 of an angle lever member 29, the other arm 30 of which extends substantially horizontally and carries a roller 31 for the engagement with the periphery of a magazine actuating cam 32, the same being fixed to the cam shaft 3. A crank 33 extending from the collar from which the arms 28 and 30 project has a contractile spring 34 connected therewith to normally urge the band magazine 25 toward said suction members 26 and 27, it being shifted there-away-from by the cam 32.

The stationary suction head 26 is carried by one end of a substantially horizontal valve member 35, the valve of which is opened and closed by the rocking of a lever 36, the latter being journaled to a bracket secured to the table 1. The lower portion of the lever 36 extends through a slot in the table and has an anti-friction roller 37 journaled at its free end, the same being disposed for engagement with the side cam face 38$^a$ of a valve actuating cam 38. When the cam face 38$^a$ is in one position the valve of the horizontal valve member 35 will be opened to establish communication between the suction head 26 and a hollow supporting post 39, the latter being fixed to the table 1 and having a suction pipe 40 connected therewith, preferably at its lower end.

A by-pass 41 connects a vertical valve member 42 with said hollow supporting post 39 so that suction is simultaneously created in the member 42 as well as in said post. Disposed in longitudinal alinement with the vertical valve member 42 and parallel thereto, is a pair of standards 43, the upper ends of which have bearings for journally mounting the opposite ends of a tubular suction arm carrying shaft 44. One end of this tubular shaft 44 is closed and its other end communicates with a laterally extending pipe section 45 that extends laterally from the valve member 42.

At spaced points in the wall of the tubular shaft 45 are openings 46 which establish communication between the interior thereof and the suction arms 27. The ends of the arms 27 which are connected with the tubular shaft 44 each have a head 47, the same having a sliding and rotative engagement with said shaft whereby adjustment of the intake ends of the suction arms 27 may be made with respect to each other and to said stationary suction head 26. When once adjusted the arms are retained in locked position with respect to the shaft 44 by set screws 48.

The valve of the valve member 42 is controlled in proper time to the actuation of the valve of the other valve member 35 by said valve actuating cam 38. To perform such an operation, the stem of said valve of the member 42 is extended downwardly below the table 1 as indicated at 49 where it is intermittently engaged by one end of a lever 50, the opposite end of which is fulcrumed on a supporting shaft 51 on which the angle lever 29 is journaled. The intermediate portion of the lever 50 carries a roller 52 which is in continuous engagement with the valve actuating cam 38 and is intermittently operated upon by the cam face 38$^b$ thereof.

Although suction is created successively in the head 26 and arms 27 nevertheless the valve of the horizontal valve member 35 is closed soon after the band B has been removed from the magazine 25 so that said head 26 is rendered ineffective. Immediately after this occurs the shaft 44 is rocked in a direction to move the suction arms 27, which are normally positioned substantially horizontal downward until they are practically vertical, the band B at such time being located directly over the portion of the cigar or the like around which it is to be wrapped.

The position of the band B is thus changed by the operation of a suction arm actuating cam 53, with the periphery of which the anti-friction roller of a lever 54 engages, one end of said lever being pivoted to a connecting rod 55 and the other end journaled on said supporting shaft 51. The upper end of the connecting rod is pivoted to a crank 56 carried by one end of the tubular rock shaft 44.

During movement of the suction arms 27 from their horizontal to their vertical positions, one end of the band B carried thereby is brought into engagement with the periphery of a moistening roller 57 whereby to dampen the patch of dried mucilage on said end of the band which is usually provided on practically all bands. The moistening roller 57 is preferably continuously revolved in a basin or trough 58 of water secured upon the table 1, it being fixed to the end of a shaft 59, the latter having a grooved pulley, around which and a similar pulley 61 carried by the pulley 5, a belt is adapted to be trained.

After the band B has been located over the cigar, or other article to be banded, by the suction arms 27, it is positioned therearound by a wrapping ribbon 62 normally disposed horizontally and carried by a pair of spaced wrapping arms 63, the latter being pivoted to a two-part vertically reciprocative carriage 64, one being connected with each part of the latter. Each of the arms 63 is formed of a pair of plates 65 held in spaced relation by the pintles of anti-friction rollers 66, 67, and 68, which are disposed therebetween, the first mentioned roller 66 being engaged by leaf springs 69 for forcing the arms toward each other and to cause the rollers 67 to continuously contact with cam faces 70 formed on the lower end of a stationary vertical guide bar 71.

The carriage 64 is adapted to slide on said guide bar 71 in a manner to be hereinafter more particularly set forth so that the roller 67 will be intermittently brought into engagement with the cam faces 70, and because of the shape of these faces, the rollers 68 will be successively moved nearer to each other and then outwardly away from each other. This causes the free ends of the arms 63 to readily follow the contour of the cigar or other article being banded and to make the band B fit snugly thereabout as shown in Fig. 15. Tension is always maintained on the wrapping ribbon 62 by having the opposite ends thereof connected with contractile springs 72.

Figure 2:
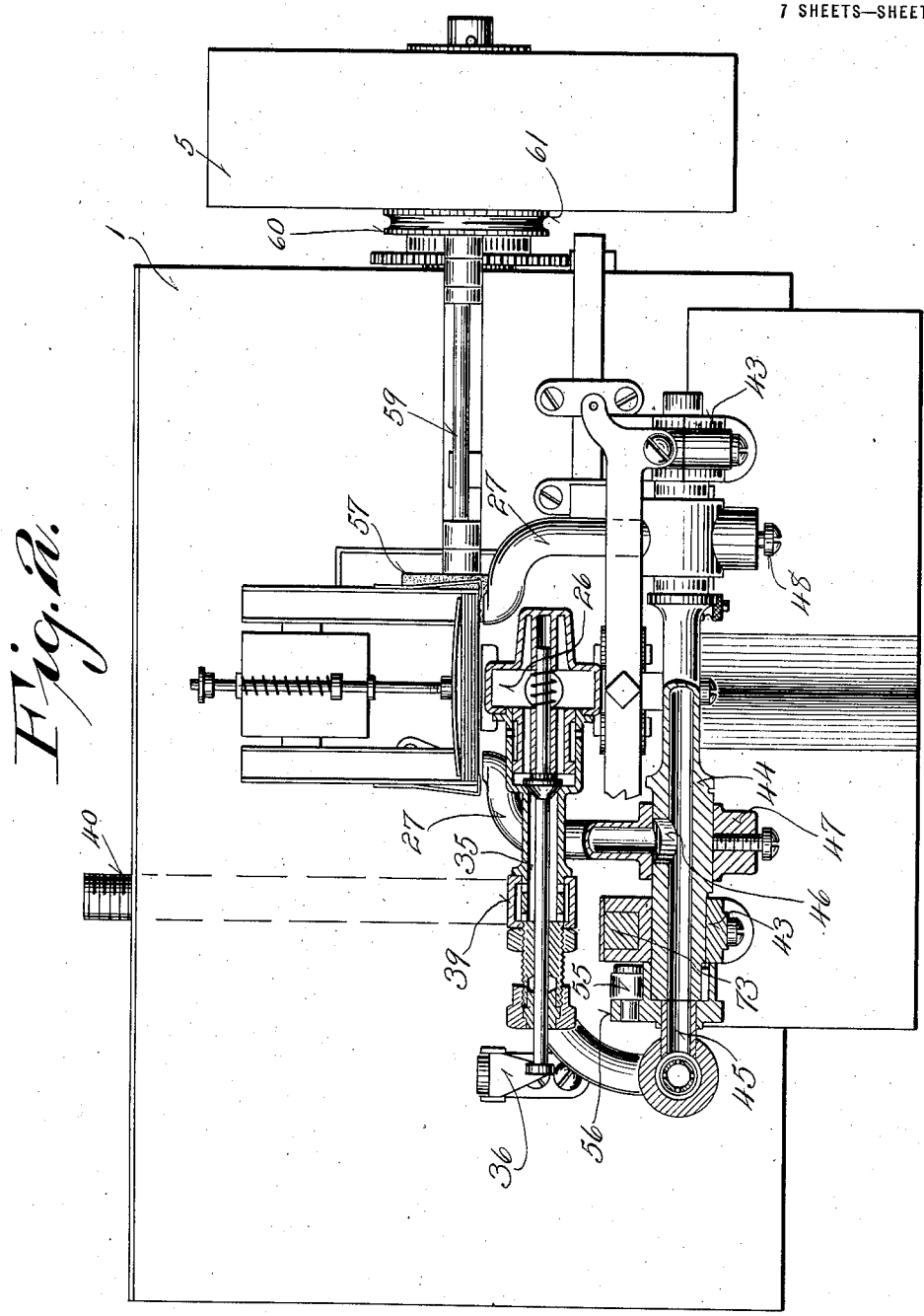
Fig. 2 is a plan view, partly in section, of the parts shown in Fig. 1.
Figure 3:
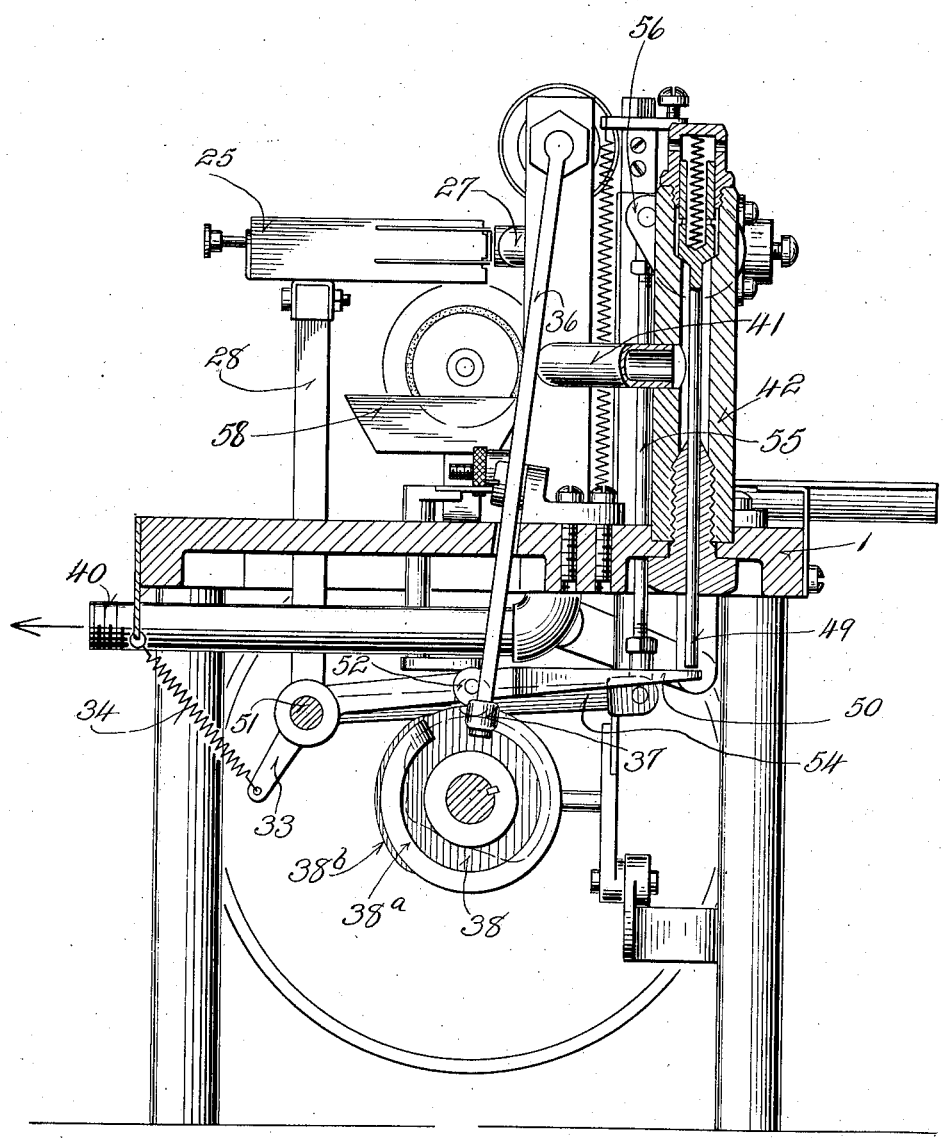
Fig. 3 is a vertical transverse sectional view taken substantially on the plane of the line 3—3 of Fig. 1.

The two-part carriage 64 is raised and lowered to procure a consequent movement of the arms 63 by the reciprocation of legs 73, one of which is secured to the outer end of each part thereof. These legs are guided in channels cut in the standards 43 as shown in Fig. 2, the inner portions of the parts of the carriage being retained in operative position with respect to each other by having sliding contact with said vertical guide bar 71. The lower end of each of the legs 73 rests on the free end of a lever 74, the opposite ends of said levers being pivoted to the supporting shaft 51, while their intermediate portions have anti-friction rollers 75 for contact with the peripheries of carriage actuating cams 76, both of which cams being fixed to the shaft 3.

Each part of the carriage 64 is movable independently of the other, the drop of each part being regulated by a set screw 77, the lower ends of which engage stops 78 on the top of the standards 43. By such means the arms 63 may be shifted so that when they are in their lowermost position, one of the rollers 68 will be higher than the other. Contractile springs 79 normally urge the parts of the carriage to move downwardly, upward movement thereof being readily procured by said cams 76.

Referring now to Figs. 15, 16 and 17, it will be noted that after the parts of the carriage 64 have dropped to wrap the band B partially about the cigar or the like C, the next operation is to move the non-pasted end against the cigar until it hugs the same, after which the other or pasted end is lapped thereover to complete the application of the band. The first mentioned end of the band is shifted into position by a wiper blade 80, the shape of which is clearly shown in Figs. 1 and 10, said blade being fixed to the upper end of a vertical rock shaft 81 journaled in the work table 1. The lower end of the rock shaft has a crank 82 fixed thereto to which a contractile spring 83 is connected to normally hold the wiper blade in retracted inactive position. An anti-friction roller 84 carried by the free end of the crank 82 continuously contacts with the cam face of a wiper blade actuating cam 85 which, when rotated by the shaft 3 intermittently rocks the shaft 81 and consequently oscillates the blade 80.

While the wiper blade 80 is operating upon the non-pasted end of the band B, a band affixing member 86 is being moved into position to force the pasted end thereover. The same includes a carriage 87 slidable in guides 88 on the table 1 and a rocker arm 89 pivoted as at 90 to the carriage. Said arm 89 is preferably of the skeleton type, similar to the wrapping arms 63, that is to say it comprises a pair of plates 91 retained in spaced relation to each other by an anti-friction roller 92.

Movement of the pasting or band affixing member 86 in one direction is secured by the rocking of a lever 93 pivoted as at 94 to a bracket arm 95, the intermediate portion of the lever having an anti-friction roller 96. A cam 97 is fixed to the shaft 3 in position to be engaged by said roller 96, the latter being urged theretoward by a contractile spring 98. From Fig. 9 it will be noted that the lever 93 is connected with the pintle 90 of the arm 89 by a link 99.

After the band affixing member 86 has been moved a predetermined distance toward the left side of the machine by the lever 93, and preferably when the roller 92 has forced the pasted end of the band B beneath the cigar C, a leaf spring 100, which projects upwardly from the arm 89, engages an adjustable stop 101, whereupon said arm 89 is caused to rock and to move the roller 92 upwardly to more closely follow the shape of the cigar C. The pasted end of the band B is thus tightly engaged with the other end.

Having thus particularly described the various parts of my invention in considerable detail, I will now briefly explain the operation of the complete machine. It will be assumed that the pulley 5 is being continuously rotated by suitable driving mechanism and that any preferred type of air exhauster is in communication with the suction pipe 40. Except for these parts of the machine and the moistening roller 57, which is continuously rotated with the pulley 5, the mechanism is entirely inactive until a cigar is placed in the trough 7 of the tray 6 and forced inwardly against the stop 8.

Upon movement of the stop in the direction of the arrow shown in Fig. 4, the pawl 13 will be released for engagement with the teeth of the ratchet wheel 12 as hereinbefore mentioned, the result being that the normally stationary cam shaft 3 will be rotated with the pulley 5. Inasmuch as all of the actuating cams are fixed upon this shaft 3, any movement thereof will necessarily cause the several mechanisms controlled by said cams to be operated. As previously pointed out it is desirable that the cam shaft 3 be rotated only one revolution before being automatically disconnected from the continuously rotating pulley 5. Therefore all of the actuating cams are accurately positioned with respect to each other to obtain the proper timing in the operations of the various mechanisms.

The first mechanism which is brought into play after the shaft 3 is coupled with the pulley 5 is that for moving the band magazine toward the suction members 26 and 27, such being controlled by the cam 32. However, the valves of the valve members 35 and 42 are opened in synchronism with the movement of the magazine so that by the time that the outermost band B carried in said magazine engages the head 26, a vacuum will have been created therein for the purpose of sucking said band B from the plurality of the same in the magazine. Thus when the magazine returns to its normal position the band B will be left behind.

Immediately after the retraction of the magazine the valve member 35 is closed and the cam face of the cam 53 moved into position to rotate the hollow shaft 44 for the purpose of shifting the suction arms 27 to their vertical position. The carriage 64 next drops to permit the ribbon 62 to wrap the band B around the cigar, this lowering of the carriage being due to the fact that the cam faces of the cams 76 are moved out of engagement with the rollers 75 of the carriage actuating arms 74; the carriage remains in this position until the band B has been successively acted upon by the wiper blade 80 and the roller 92 of the band affixing member 86, whereupon it is moved to its normal raised position.

After all of these several operations have taken place, which is during one revolution of the cam shaft 3, the trip finger 19 engages the trip arm 21 to release the pawl 13 from the teeth of the ratchet wheel 12. The banding mechanism again remains idle until a new cigar has been laid on the tray 6 and the stop 8 shifted. The various steps in the processes of applying the band B to the cigar C which are controlled by the cams are illustrated in the semi-diagrammatic views 11 to 17 inclusive.

I claim:

1. In a machine of the class described, a stationary band engaging member, means associated therewith for procuring adherence of a band thereto, a band magazine movable to and away from said enaging member to procure engagement of successive bands with said member, an article support, and means engageable with bands adhering to said first engaging member for conveying said bands to the article support.

2. In a machine of the class described, a stationary pneumatic band engaging member, a magazine movable toward and away from said member for engagement of successive bands with said member, an article support, means engageable with bands held by said band engaging member for conveying the bands to the article support, and means for relieving suction in said band engaging member synchronously to engagement of said means with a band engaged with said member.

3. A machine of the class described including a pneumatic band engaging member, a band magazine for holding bands at their end portions and movable toward and away from the member to engage intermediate portions of successive bands with the member whereby to procure detachment of successive bands from the magazine upon movement of the magazine away from said member by flexing the outermost band to draw the ends of the said outermost band toward each other, an article support and means engageable with bands held by said band engaging member for removing bands therefrom and conveying said bands to an article support.

4. A machine of the class described including a pneumatic band engaging member, a band magazine movable toward and away from said member to engage intermediate portions of successive bands therewith, an article support, and a pair of pneumatic band engaging members disposed at the sides of the first named member, and movable to convey said bands to the article support.

5. A machine of the class described including a pneumatic band engaging member, a band magazine movable toward and away from said member to engage intermediate portions of successive bands therewith, an article support, a pair of pneumatic band engaging members disposed at the sides of the first named member and movable to convey said band to the article support, and means for procuring suction in said pair of pneumatic members subsequent to engagement of a band with the first named pneumatic member.

6. A machine of the class described including a stationary pneumatic band receiving member, a magazine movable toward and away from said stationary member to engage successive bands therewith, an article support, a tubular shaft, hollow band engaging arms on said shaft movable upon rocking of the shaft from a position at the sides of the stationary band engaging member to a position adjacent the article support, means for procuring vacuum in said shaft, and means for intermittently rocking said shaft.

7. A machine of the class described including a stationary band engaging member, a magazine movable toward and away from said band engaging member to engage successive bands therewith, an article support, a pair of pneumatic band engaging members movable from a position at the sides of the stationary band engaging member to a position adjacent an article on the support, and folding means movable between said movable band engaging members and an article on the support.

8. A machine of the class described including a magazine, an article support, a pair of pneumatic conveyer arms movable from a position adjacent the magazine to a position adjacent an article on the support, means for transferring succesive bands to said conveyer arms, and means movable between said pneumatic conveyer arms and the adjacent sides of an article on a support for bending the band around the article.

9. A machine of the class described including a magazine, an article support, a pair of pneumatic conveyer arms movable from a position adjacent the magazine to a position adjacent an article on the support, means for transferring successive bands to said conveyer arms, a paste supply means located adjacent the path of movement of one of the arms for supplying paste to bands carried by said arm, and means movable between said pneumatic conveyer arms and the adjacent sides of an article on the support for bending the band around the article.

10. A machine of the class described including a magazine, an article support, a pair of pneumatic conveyer arms movable from a position adjacent the magazine to a position adjacent an article on the support, means for transferring successive bands to said conveyer arms, a driven paste supply roller located adjacent the path of movement of one of the pneumatic conveyer arms for supplying paste to bands carried by said arm, and means movable between said pneumatic conveyer arms and the adjacent sides of an article on the support for bending the band around the article.

11. A machine of the class described including an article support, means for positioning a band adjacent an article on said article support, means movable toward an article on the support for bending the intermediate portion of the band about the support, a member oscillatory in a plane substantially tangential to the periphery of the article for bending one end portion of the band about the article, and a member movable transversely of the article for bending the other end of the band about the article.

12. A machine of the class described including an article support, means for positioning a band adjacent an article on said article support, means movable toward an article on the support for bending the intermediate portion of the band about the support, a member oscillatory in a plane substantially tangential to the periphery of the article for bending one end portion of the band about the article, a member movable transversely of the article for bending the other end of the band about the article, and means for applying inward pressure to said last named member during the final portion of its movement.

13. A machine of the class described including an article support, means for positioning a band adjacent an article on said article support, means movable toward an article on the support for bending the intermediate portion of the band about the support, a member oscillatory in a plane substantially tangential to the periphery of the article for bending one end portion of the band about the article, a member movable transversely of the article for bending the other end of the band about the article, a spring carried by said last named member, and a stop engageable by said spring in the last portion of bending movement of said member for applying inward pressure to said member.

14. A machine of the class described including an article support, means for positioning a band adjacent an article on said article support, means movable toward an article on the support for bending the intermediate portion of the band about the support, a member oscillatory in a plane substantially tangential to the periphery of the article for bending one end portion of the band about the article, an intermediately pivoted member movable transversely of the article, and having one end portion engageable with the band to bend the other end portion of the band about the article, a spring extending from one side of the other end portion of said intermediately pivoted member, and a stop engageable by said spring to urge the first named end portion of said intermediately pivoted member toward the article.

15. A machine of the class described including an article support, a magazine, a plurality of means operable in a complete cycle for conveying a band from the magazine and bending said band about an article on the support, a drive shaft for said means, a drive pulley loose on the shaft, ratchet teeth on said pulley, a pawl pivotally carried by the shaft and engageable with said ratchet teeth, a stop on the pawl, a rock shaft, a crank arm on the rock shaft, a stop on the crank arm engageable with the pawl to hold said pawl away from the teeth, a member connected with said crank shaft and operable by an article on the support for rocking the shaft to release the pawl, and a member carried on the drive shaft for rocking the rock shaft to pawl engaging position.

In testimony that I claim the foregoing I have hereunto set my hand at Milwaukee, in the county of Milwaukee and State of Wisconsin.

RICHARD RADDATZ.